(No Model.) 2 Sheets—Sheet 1.
W. RABICH.
MOTOR.
No. 496,486. Patented May 2, 1893.

Witnesses
Inventor
Wm Rabich.
By his Attorneys
Keller & Starek (No Model.) 2 Sheets—Sheet 2.

W. RABICH.
MOTOR.

No. 496,486. Patented May 2, 1893.

Witnesses:
John Ott
Wm. J. Walker

Inventor.
Wm. Rabich.
By his Atty's
Keller & Starek

UNITED STATES PATENT OFFICE.

WILLIAM RABICH, OF ST. LOUIS, MISSOURI, ASSIGNOR, BY DIRECT AND MESNE ASSIGNMENTS, TO THE HERRMANN-RABICH FAN AND MOTOR MANUFACTURING COMPANY, OF SAME PLACE.

MOTOR.

SPECIFICATION forming part of Letters Patent No. 496,486, dated May 2, 1893.

Application filed September 28, 1892. Serial No. 447,121. (No model.)

*To all whom it may concern:*

Be it known that I, WILLIAM RABICH, of the city of St. Louis, State of Missouri, have invented certain new and useful Improvements in Motors, of which the following is a full, clear, and exact description, reference being had to the accompanying drawings, forming a part hereof.

My invention relates to improvements in spring motors and consists in the novel arrangement and combination of parts more definitely stated in the specification and set forth in the claim.

Figure 1:
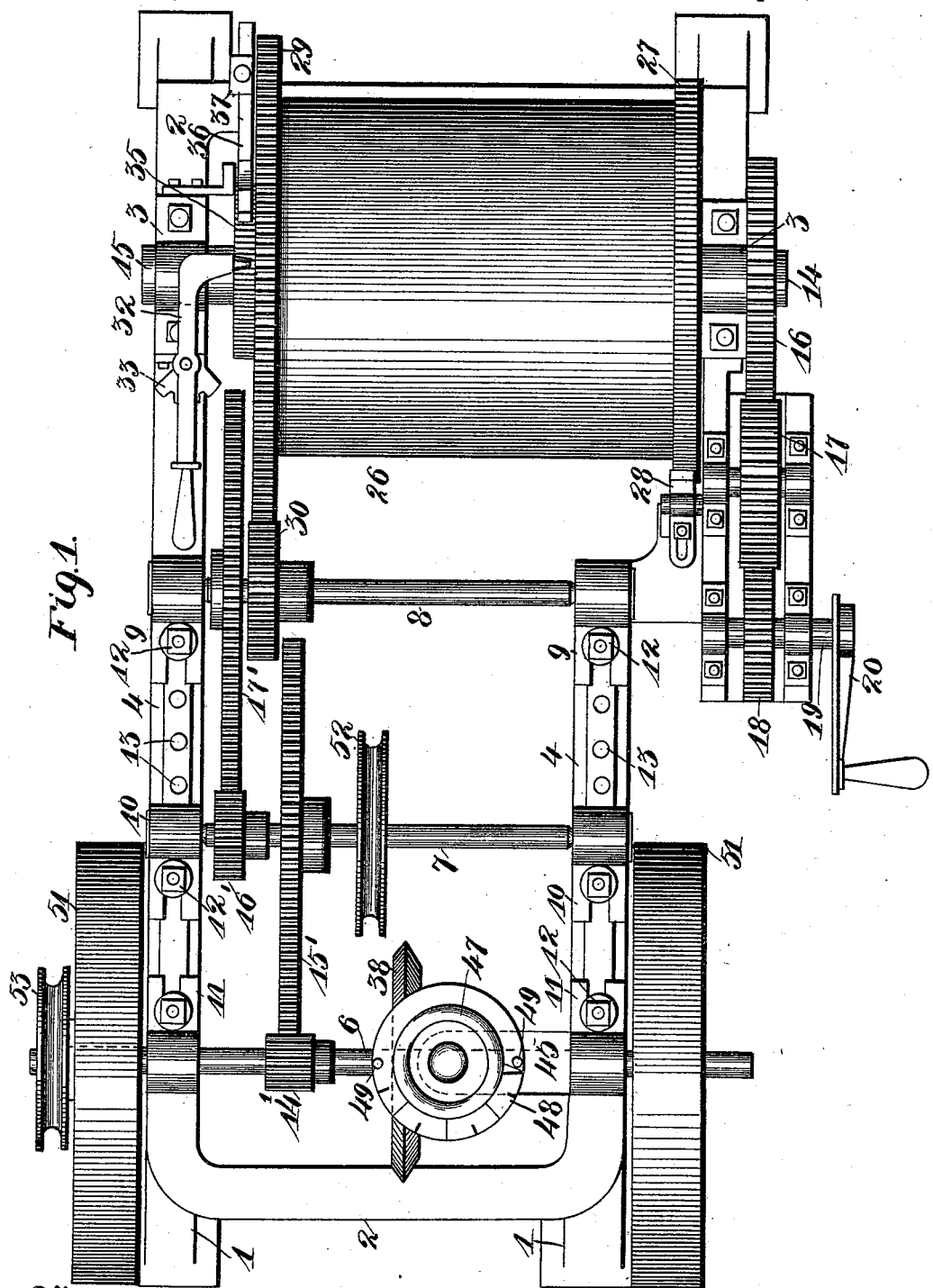
Figures 2, 3:
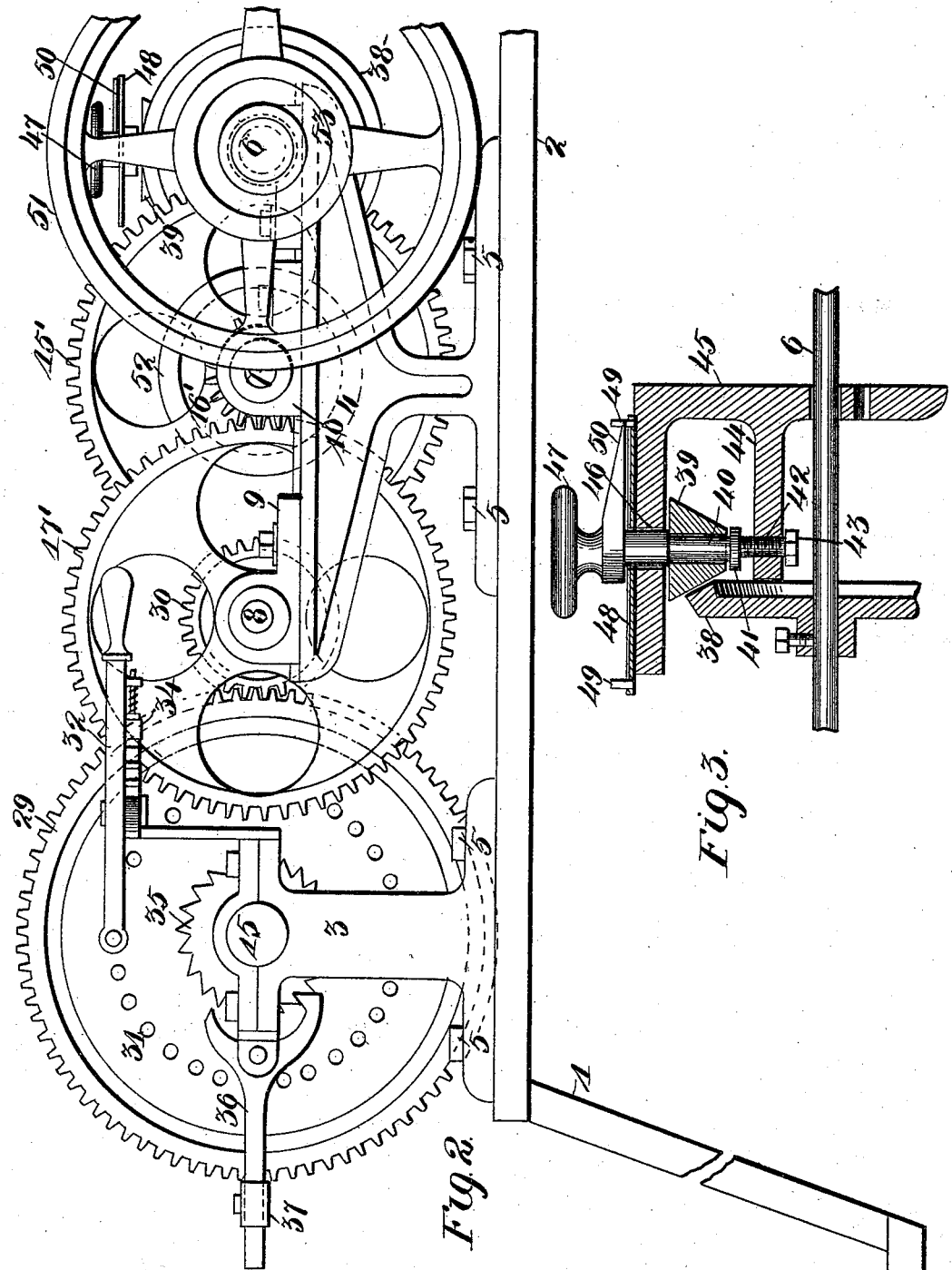

In the drawings Figure 1 is a top plan view of my invention. Fig. 2 is a side elevation of the same. Fig. 3 is a sectional view of the speed regulator.

Referring to the drawings 1 represents a frame along the top plate 2 of which are secured movable supports 3 and 4 for shafting and connecting gear wheels. The support 4 is movable along plate 2 to accommodate gears of various diameters. The supports are secured to the frame by suitable bolts 5 as seen in Fig. 2. Of course the supports 3 and 4 are arranged in pairs as will be seen in Fig. 1. The support 4 is T-shaped and the upper expanded portion of the T supports the shafts 6, 7, and 8. These shafts are carried by the blocks or bearings 9, 10, and 11 which are adjustable along the upper surface of the T and secured in any desired position by the bolts 12 passing through suitable openings 13 as seen in Fig. 1. The said shafts are connected by suitable gears. The supports 3 have bearings through which pass the shafts 14 and 15 the shaft 14 being free to revolve in the hollow end of the shaft 15 as seen in Fig. 4, said hollow end of the shaft 15 being stepped to form a suitable support for the narrow end of shaft 14. The outer end of the shaft 14 carries a gear 16 meshing with the gears 17 and 18 of diminishing size and carried by shafts on the plate 2 of the frame 1. The gear 18 has a projecting shaft 19 to which is secured a crank or handle 20 for winding up the springs which serve as the motive power in the present device.

As seen from Fig. 4 the shafts 14 and 15 have each a lug 21 to which the inner ends of the motor springs 22 are attached. The outer ends of the springs 22 are attached or secured to a bar 23 in a reverse direction as seen from Fig. 5. If by means of the crank 20 and intermediate gearing 16, 17, and 18, the shaft 14 is turned to the right in Fig. 4, the tendency would be to wind the spring 22 on the shaft 14 and depress the bar 23, that is to draw the bar 23 nearer the shaft. Another result would be to carry the bar 23 around the shaft 14. The bar 23 has therefore two motions the one being a motion around the shaft 14, and the other being a reciprocating motion to and from the shaft 14. In its reciprocating movement the said bar is limited by the disk 24 interposed between the two springs 22 and which is located at the end of the shaft 15 at its juncture with shaft 14. The disk 24 is loose on shaft 15, and has an opening 25 cut therein for limiting the movement of the bar 23 and guiding said bar at the same time. From the foregoing it will be apparent that as the shaft 14 is revolved the spring 22 attached thereto will be wound up, and as this spring carries around and at the same time depresses the bar 23, the latter having the second spring 22 attached thereto in a reverse direction as seen in Fig. 5, will wind said second spring secured to the shaft 15 from the end secured to the bar 23. The two springs 22 will therefore be wound simultaneously, the one from its inner end or that secured to the shaft 14, whereas the second spring or that secured to the shaft 15 will be wound from its outer end or the end secured to the bar 23. The importance of this mechanical arrangement of the springs is apparent, the regularity of tension of the springs is preserved and the power of the springs is more constant. It is well known that the tension of a spring decreases as it unwinds, but in the case of a motor of the character here described the tension must be kept constant so that regularity of speed may be preserved. The springs are confined in a suitable casing 26 surrounding the disk 24 with which it forms loose contact.

Secured to the shaft 14 adjacent to the casing 26 is a ratchet wheel 27 with the teeth of which co-operates the pawl 28 secured to the top plate 2 of the frame 1, said pawl preventing any reverse motion of the shaft 14 after the device is once wound up.

To the shaft 15 is secured a gear 29 meshing with the reduced pinion 30 on the shaft 8.

The gear wheel 29 serves as a means for stopping the machine at will having perforations or holes 31 circularly arranged as seen in Fig. 2. Into these holes 31 works the end of a brake-lever 32 pivoted at one side of the frame and at the pivot is a toothed arc 33 with which co-operates a spring-operated pin 34 secured to said lever as best seen in Fig. 2 which pin holds the brake-lever in any desired position, and in Figs. 1 and 2 it is shown in the opened position.

On the shaft 15 and adjacent to the gear 29 is a ratchet 35 with which co-operates the escapement 36 suitably weighted by the weight 37.

By the employment of the weighted escapement above referred to, the motor would be instantly stopped should an accident occur. This is obvious by the teeth of the gear 35 co-operating with said escapement. When the gear 35 rotates slowly, that is when the motor is running under ordinary circumstances, the escapement will operate and allow the said gear to turn in the well known manner. Should an accident occur however, and the gear 35 be caused to rotate at a great speed, the escapement will not have time to work, and the sudden pressure of the teeth of said gear against the escapement will stop the machine, one of its engaging ends being locked under one of said teeth of the gear.

In Fig. 3 I have shown a form of a speed regulator by which the speed or velocity of the machine may be varied. On the shaft 6 is a friction bevel wheel 38 with which co-operates a second bevel wheel 39 free to revolve on the shaft 40. The shaft 40 terminates on a base 41 by which the cone or bevel wheel 39 can be raised. Below the base 41 is a screw 42 terminating in a nut 43 the screw working in the projecting arm 44 of the standard 45 secured to or forming a part of the frame 1. The shaft 40 passes through an opening 46 in the top of the standard 45 and secured to the shaft above the opening is a knob 47 for operating the screw 42. It will be seen that by turning the screw 42 in one direction the cone wheel 39 will be raised out of contact with the bevel wheel 38, and by turning the same in a reverse direction the cone 39 will be made to press thereon and the speed of the shaft 6 will be reduced or stopped if found desirable.

In order to limit the action of the screw 42 and consequently the action of the cone 39, the standard 45 is provided with a plate 48 surrounding the shaft 40, and this plate is provided with pins or pegs 49 which limit the movement of an index arm or pointer 50 secured to the shaft 40. By thus limiting the movement or turning of the shaft 40, the degree of tension or binding of the cone 39 upon the bevel wheel 38 is limited, and there is then no danger of stopping the machine entirely by an accidental binding of the cone 39 with the bevel wheel 38. The shaft 6 is provided with usual fly wheels 51, and the power is transferred from the belt pulley 52 on the shaft 7 and may also be further transmitted from the belt pulley 53 on the shaft 6.

From the foregoing the operation of the device can be readily understood and needs no explanation in detail.

To obtain the best results, experience has demonstrated that the general disposition of the parts as described, and the gearing arrangement are important. It is necessary to have the small pinion 14' on the main shaft 6 co-operating with the large gear 15', and the next shaft must have a small pinion 16' co-operating with a larger gear 17' on the shaft adjacent to it. Again, the general arrangement of the motor springs is a very important feature of my invention. Of course it is obvious that the machine can be varied slightly, without departing from the spirit of my invention.

Having particularly described my invention, what I claim is—

A motor comprising suitable gearing and means for propelling the same, a speed regulator, one of said gears having holes 31 therein, a toothed arc 33 fixed to the frame of the motor, a brake lever 32 pivoted to the upper surface of said arc, and a spring-operated pin 34 co-operating with said arc one end of which lever is adapted to be received by the said holes for stopping the motor, substantially as set forth.

In testimony whereof I affix my signature in the presence of two witnesses.

WILLIAM RABICH.

Witnesses:
D. IND. NEUDORF,
C. F. KELLER.